(12) United States Patent
Sharp

(10) Patent No.: US 7,510,280 B2
(45) Date of Patent: Mar. 31, 2009

(54) HIGH YIELD BONDING PROCESS FOR MANUFACTURING POLYCARBONATE POLARIZED LENSES

(75) Inventor: Gary D. Sharp, Boulder, CO (US)

(73) Assignee: Real D, Beverly, CA (US)

( * ) Notice: Subject to any disclaimer, the term of this patent is extended or adjusted under 35 U.S.C. 154(b) by 0 days.

(21) Appl. No.: 11/468,717

(22) Filed: Aug. 30, 2006

(65) Prior Publication Data

US 2006/0269697 A1 Nov. 30, 2006

Related U.S. Application Data

(60) Provisional application No. 60/596,086, filed on Aug. 30, 2005.

(51) Int. Cl.
G02C 7/02 (2006.01)
(52) U.S. Cl. .......... 351/177; 359/819; 351/178; 156/60
(58) Field of Classification Search ........... 359/819; 351/177
See application file for complete search history.

(56) References Cited

U.S. PATENT DOCUMENTS

| | | | |
|---|---|---|---|
| 4,536,063 A | 8/1985 | Southwell | |
| 5,472,538 A | 12/1995 | Minakuchi et al. | |
| 5,571,567 A | 11/1996 | Shah | |
| 5,751,384 A | 5/1998 | Sharp | |
| 5,888,603 A | 3/1999 | Fergason | |
| 5,990,996 A | 11/1999 | Sharp | |
| 6,004,417 A | 12/1999 | Roesch et al. | |
| 6,096,375 A | 8/2000 | Ouderkirk et al. | |
| 6,156,433 A | 12/2000 | Hatori et al. | |
| 6,235,396 B1 * | 5/2001 | Dixon | 428/412 |
| 6,319,433 B1 * | 11/2001 | Kohan | 264/1.32 |
| 6,355,124 B1 * | 3/2002 | Blomberg et al. | 156/99 |

(Continued)

FOREIGN PATENT DOCUMENTS

JP 442202 2/1992

(Continued)

OTHER PUBLICATIONS

International search report and written opinion of international search authority for corresponding PCT application No. PCT/US06/33933 mailed Mar. 13, 2008.

*Primary Examiner*—Jessica T Stultz
(74) *Attorney, Agent, or Firm*—Baker & McKenzie LLP

(57) ABSTRACT

The disclosed technique employs a process for mating polarizing wafers to clear lenses using a high-yield bonding process. A thermoformed polarizing wafer is bonded to a clear lens of similar curvature via a solvent bonding process. In one embodiment, a system includes a translation stage configured to press a first lens to a second, with a solvent therebetween, such that a portion of the first lens initially contacts a portion of the second lens. An alignment fixture holding the second lens conforms to the curvature of the second lens, and a deformable sheet mounted proximate to the alignment fixture flexes in response to the force so that either of the first or second lenses conforms to a curvature of the other, and so that the pressure of the first lens against the second lens presses the solvent radially outward to the perimeter of the second lens to bond the first lens to the second lens.

17 Claims, 2 Drawing Sheets

U.S. PATENT DOCUMENTS

| | | | |
|---|---|---|---|
| 6,562,466 B2 * | 5/2003 | Jiang et al. | 428/412 |
| 6,638,583 B1 | 10/2003 | Sharp et al. | |
| 6,814,896 B2 * | 11/2004 | Bhalakia et al. | 264/1.32 |
| 2004/0114242 A1 | 6/2004 | Sharp et al. | |
| 2005/0140033 A1 * | 6/2005 | Jiang et al. | 264/1.7 |
| 2007/0034321 A1 * | 2/2007 | Glacet et al. | 156/230 |

FOREIGN PATENT DOCUMENTS

| | | |
|---|---|---|
| JP | 10-221525 | 8/1998 |
| JP | 10305544 | 11/1998 |
| JP | 11160535 | 6/1999 |
| WO | 00/07172 | 2/2000 |

\* cited by examiner

HIGH YIELD BONDING PROCESS FOR MANUFACTURING POLYCARBONATE POLARIZED LENSES

This application claims priority to U.S. provisional application number 60/596086 filed Aug. 30, 2005 entitled "High yield bonding process for manufacturing polycarbonate polarized lenses" and is incorporated herein by reference.

TECHNICAL FIELD

Background

Polarizing lenses, which have the property of attenuating glare, have become commonplace in plano and prescription sunglasses. Generally speaking, plastic polarizing lenses are formed from polarizer sheet stock. Linear polarizer sheets are conventionally manufactured by laminating a polarizing film between two protective films, typically using an adhesive. The functional polarizer layer is made by stretching a thin polyvinyl alcohol (PVA) film (e.g., about 35 microns), and subsequently dipping it in a dye solution. Polarizing lenses using thermoplastic optical materials can be manufactured using a thermo-forming process, producing curved (typically spherical) wafers. The selection of protective film materials for manufacturing such products affects the thermo-forming process employed, and both of these selections then dictate the birefringence induced in the protective layer of the wafer. Generally speaking, the birefringence of the outer protective film should preferably not alter the state of polarization of light entering the finished lens. If birefringence does become a problem, observable nonuniformities and other deleterious effects may compromise the effectiveness of the polarizer in reducing glare.

One conventional technique for minimizing birefringence is to simply use polymer materials that tend to remain isotropic throughout the process of manufacturing the polarizer sheet and the thermoforming process. Examples of these include cellulose acetate butyrate and cellulose triacetate traditionally used for the manufacturing of polarizing laminates. Another known technique is to intentionally induce a controlled deterministic birefringence that would have no impact on lens performance. An example of this is "super-stretch" polycarbonate film. The polycarbonate is heated and highly stretched, in a manner similar to the formation of retardation films in display applications, in order to induce a well-defined (down-web) slow optic axis. Using roll-to-roll processing, PVA polarizer is bonded between such polycarbonate layers (typically 300 to 700 microns thick) using a suitable (e.g., urethane) adhesive. The uniaxial retardation of the polycarbonate contributes no depolarization or birefringence color when it is oriented along the polarizer absorption axis. Moreover, the high degree of molecular ordering tends to insure that the optic axis remains stable throughout the thermoforming process.

The super-stretch polycarbonate overcomes many of the issues associated with many low birefringence substrates. Polycarbonate, for example, can be manufactured with less than 10 nm of birefringence; however, it is highly susceptible to random retardation and optic axis orientation introduced by the thermoforming process. That being said, a highly oriented film is relatively free of spatial inhomogeneities in polarizing efficiency and color appearance that can affect the product quality.

Moreover, the super-stretch polycarbonate polarizer is amenable to prismatic correction in plano lenses, or the creation of prescription polarizing lenses, both using insert injection molding. In insert injection molding techniques, a thermoformed polarizing wafer is inserted into a mold cavity, which has the same or similar curve as the lens. Then, an injection molding screw forces molten polycarbonate thermoplastic resin into the gap between the wafer and a machined metal mold. After cooling, a clear lens is formed onto the inner surface of the wafer, and the collective structure is what is typically referred to as the "lens" used in glasses. Since chemically identical materials are typically used in this technique, the inner surface of the lens is effectively a monolithic polycarbonate structure. This resulting lens may be a finished plano sunglass lens, or may be supplied to a surfacing laboratory for grinding of the back concave surface to produce a prescription lens. Reliability of the bond between injection molded polycarbonate and a contaminant-free polycarbonate wafer inner surface is generally very good under normal use conditions for lenses (e.g., resisting the heat typically present inside of a vehicle during the summertime).

Unfortunately, with the above technique there may still be significant cost associated with yield loss of high value material (i.e., the thermoformed polarizing wafer). The injection molding process can typically account for 15% loss of polarizing wafers, primarily due to cosmetic defects. For example, debris can occur from a number of sources, including specks of burned polycarbonate material from the injection molding screw, particles in the resin, environmental debris, or from particles bonded to the wafer during handling. There is thus a demand in the industry for a high-yield process that produces a clear lens on the inner surface of a polarizing wafer that does not suffer from such deficiencies. Specifically, the process should provide the optical quality and durability required by the sunglass industry, with equal or better manufacturing throughput, but with improved yield in order to reduce overall manufacturing costs.

SUMMARY

Disclosed herein are systems and methods for improving the production yield associated with the manufacturing of polycarbonate polarized lenses. The disclosed technique employs a process for mating polarizing wafers to clear lenses using a high-yield bonding process. More specifically, the disclosed principles bond a thermoformed polarizing wafer to a clear lens of similar curvature via a solvent bonding process.

In one aspect, systems for bonding lenses are provided. In one embodiment, a system includes a translation stage configured to hold a first lens having a compound curvature, wherein the translation stage is configured to provide a force towards a base with a second lens having a compound curvature such that a portion of a convex surface of the first lens initially contacts a portion of a concave surface of the second lens. In some embodiments it may be preferred to contact a central portion of convex surface of the first lens initially contacts a central portion concave surface of the second lens. In other embodiments, initially an apex of the first lens contacts a nadir of the second lens. In addition, such a system includes an alignment fixture mounted on the base and configured to conform to the curvature of the second lens to hold the second lens. Also, the system has a deformable sheet mounted on the base proximate to the alignment fixture, where the deformable sheet is configured to flex in response to the force so that either of the first or second lenses conforms to a curvature of the other, and so that the pressure of the first lens against the second lens presses the solvent radially outward from a central portion or, in some embodiments from the apex, to the perimeter of the second lens. The system still further includes a dispenser for dispensing a solvent between the lenses before they are pressed together. In such embodiments, the translation stage may be further configured to hold the first lens against the second lens such that the first lens bonds to the second lens using the solvent.

In another aspect, methods for bonding lenses are provided. In one embodiments, the method comprises providing first and second lenses, each having a compound curvature, and dispensing a solvent between the lenses. The method then includes pressing the first lens against the second lens such that a portion of a convex surface of the first lens initially contacts a portion of a convex surface of the second lens and either of the first or second lenses conforms to a curvature of the other, wherein pressure of the first lens against the second lens presses the solvent radially outward from the a central portion of the concave portion, such as the nadir, to the perimeter of the second lens. In some embodiments it may be preferred to contact a central portion of the convex surface of the first lens initially contacts a central portion of the convex surface of the second lens. In other embodiments, initially an apex of the first lens contacts a nadir of the second lens. Additionally, in such embodiments, the method includes holding the first lens against the second lens such that the first lens bonds to the second lens using the solvent.

BRIEF DESCRIPTION OF THE DRAWINGS

For a more complete understanding of this disclosure, and the advantages of the systems and methods herein, reference is now made to the following descriptions taken in conjunction with the accompanying drawings, in which.

DETAILED DESCRIPTION OF THE PREFERRED EMBODIMENTS

In accordance with the disclosed principles, thermoformed polarizing wafers are laminated to clear lenses of similar curvature via a solvent bonding process. The solvent bonding process may be the process described in U.S. Pat. No. 6,638,583, which is commonly assigned with the present disclosure and incorporated herein by reference in its entirety for all purposes. This solvent process is also discussed in the context of manufacturing lenses in sunglasses in U.S. Published Patent Application No. 2004/0114242, filed Sep. 5, 2003, and entitled "Filter for Enhancing Vision And/Or Protecting the Eyes and Method of Making Thereof," which is herein incorporated by reference in its entirety for all purposes. The solvent bonding process in the '583 patent pertains primarily to the formation of optical multilayer stacks using polycarbonate retarder films, however, the requirements for curved lenses are similar in that a strong bond is desired that preserves the optical quality of the lens elements.

As used herein the term "lens" refers to a ground or molded transparent material with opposite surfaces either or both of which are curved, by means of which light rays are refracted so that they converge or diverge to form an image. As used herein the term "clear lens" refers to a transparent lens, usually made from a plastic, that is refractive but has substantially no polarization function. A "polarizing lens" refers to a lens that transmits polarized light. Some lenses used in embodiments of the invention are referred to as "compound lenses" or lenses having "compound curvature," and are characterized by being curved along more than a single axis.

Figure 1:
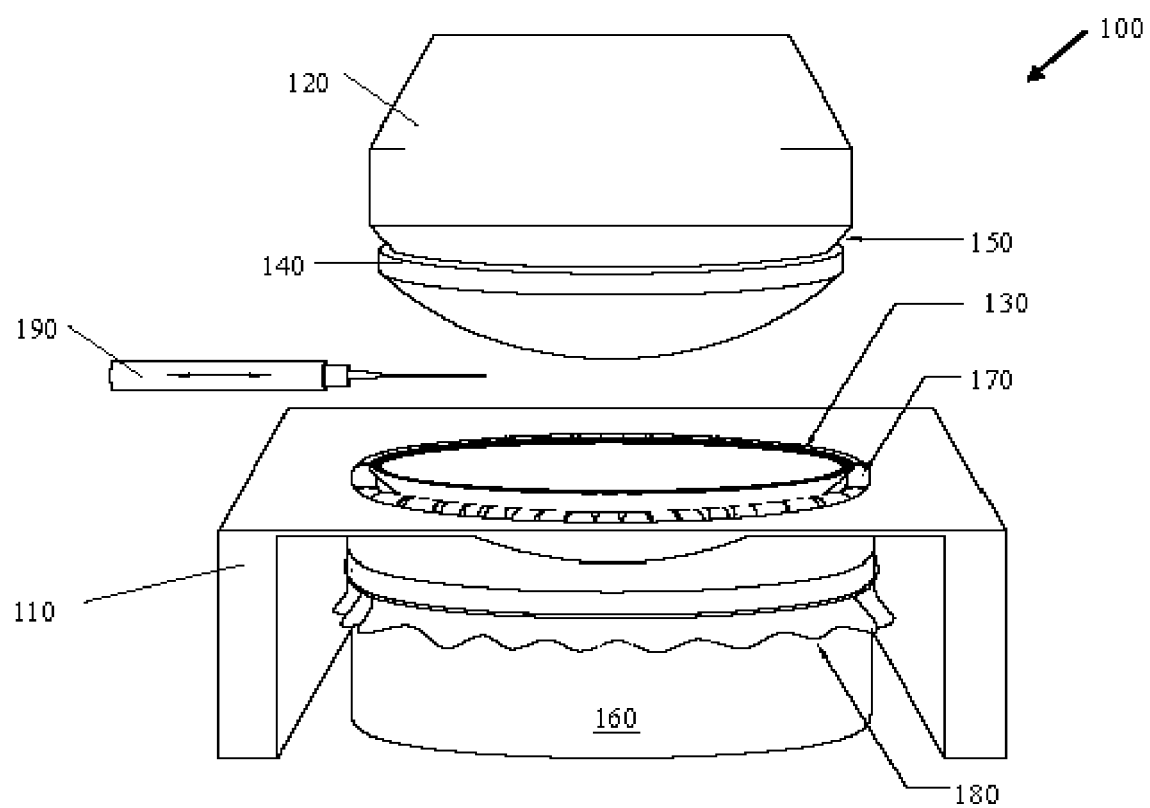
FIG. 1 illustrates one embodiment of a lens laminator device for use in bonding polarized and clear lenses in accordance with the disclosed principles.

FIG. 1 illustrates one embodiment of a lens laminator device 100 for use in bonding polarized and clear lenses in accordance with the disclosed principles. The laminator 100 includes a base 110 and a translation stage 120. The base 110 of the laminator 100 is configured to hold a compound curved polarizing lens 130, while the translation stage 120 holds a compound curved clear lens 140 to be laminated to the polarizing lens 130. In exemplary embodiments, the clear lens 140 is held in position by a vacuum chuck 150 mounted on the translation stage 120. The vacuum chuck 150 typically employs a negative air pressure to securely hold the clear lens 140 in the proper position needed to laminate it to the polarizing lens 130.

To hold the polarizing lens 130 in proper alignment for the lamination process, the base 110 includes a jig 160 having an alignment fixture 170. The alignment fixture 170 is configured to hold the polarizing lens 130 in the appropriate position for laminating, yet provide some movement of the polarizing lens 130 as the clear lens 140 is pressed against the polarizing lens 130 to ensure proper alignment between the two lenses 130, 140. In exemplary embodiments, the alignment fixture 170 is comprised of a flexible material that provides the alignment of the polarizing lens 130 to the clear lens 140 as the two are pressed together.

The help ensure the formation of a strong solvent bond between the polarizing lens 130 and the clear lens 140, the pressure and time used in the bonding process may be optimized. In a preferred embodiment, the optimized parameters (e.g., pressure, time, and solvent) are maintained over the entire laminate. When planar material, or single-axis curved materials are used, such optimization is more straightforward. Solvent can be dispensed in the nip, and after a short delay, the material can be translated through rollers. In such a technique, the solvent reservoir can uniformly soften at the molecular depth of the surfaces of the materials just prior to bonding via the pinch rollers. To the extent that the films are uniform in thickness and free of debris and inclusions, the rollers provide uniform pressure and the material is translated at a constant rate. The resulting laminate is therefore typically very uniform.

In the event that the two substrates (i.e., the polarized lens 130 and the clear lens 140) have similar compound curvature, the situation is not conducive to single-axis solvent flow. In this situation, the laminator 100 illustrated in FIG. 1 provides a substantially homogeneous exposure to pressure/time and solvent, both for optical quality and reliability reasons. Specifically, compound-curved substrates or lenses 130, 140 are laminated using a radial solvent flow process. In one embodiment of the disclosed principles, the lamination process involves dispensing solvent from dispenser 190 on the convex surface, typically at or near the nadir, of the curvature of the polarizing lens 130. Pressure that begins at a central portion of the convex surface, preferably where the solvent has been dispensed on to the lens, (from a central region, such as the apex of lens 140) is then applied, where the pressure then flows radially outward to the edge of the lenses 130, 140. The flowing pressure also presses the solvent radially outward generally from the central portion, or nadir in some embodiments, to the perimeter of lens 130. This technique is described in greater detail below, with reference to FIG. 2.

Generally speaking, conventional processes provide for some delay between dispensing the solvent on the lenses and the pressing of the lenses together. Such delay is often provided to allow the solvent to distribute uniformly during the bonding process. However, excessive exposure time of the solvent on the lenses may be sufficient to detrimentally affect the retardation properties of the material comprising the lenses. In addition, the swelling of the material caused by the absorption of solvent, is often sufficient to produce a "wavefront" distortion on the lenses that is visible in natural light. As a result, in the case of compound curved lamination, it is important that the solvent dispensing be well controlled, as well as the minimization of solvent exposure time.

There are a number of methods for controlling the solvent dispensing from the dispenser 190. One method involves dispensing a metered droplet of solvent on a concave portion, typically at the nadir, of the curve of the polarizing lens 130 via a needle valve in the dispenser 190 (e.g., as provided by EFD Incorporated). An actuator can translate the dispenser 190 between the two lenses 130, 140 to a precise location, followed by dispensing of the solvent and rapid removal of the dispenser 190 from the area. Semi-automated machines can precisely control the delay between the dispensing of solvent and the subsequent application of pressure.

In addition, care must also be taken to insure that the type of solvent employed for the bonding process does not degrade the appearance of the lens in natural light. Of particular importance is the selection of a solvent that does not craze/crack the substrates, creating objectionable haze, and in some cases eventual product failure. The solvent ideally acts to soften the substrate material only at a molecular depth of the surface, preserving the bulk properties, while allowing the formation of a bond with a suitable application of pressure. An exemplary solvent with these properties is methyl-amyl-ketone (MAK), though other ketones also work well. Importantly, the softening of the lens materials is what makes the delay (or lack thereof) a critical consideration in the bonding process so that distortion or other problems in the lenses do not occur.

Another technique for dispensing the solvent on the polarizing lens 130 is to dispense solvent vapor. This technique may produce a more homogeneous lamination, due to the potential for uniform solvent exposure. This can be done in a manner by dispensing a puff of solvent vapor between the lenses 130, 140, rather than dispensing a droplet of solvent directly onto a lens. The solvent can be uniformly deposited over the mating surfaces, uniformly softening the surface of the material. Pressure can then be applied in a manner that produces radial solvent flow, as described below, achieving an optical quality reliable lamination.

In yet another embodiment, one or both of the lenses 130, 140 can pass through a solvent vapor environment prior to physical contact with each other. In such embodiments, a solvent-rich environment is created or maintained, either by evaporation or atomization. One or both lenses 130, 140 can pass through this environment prior to experiencing the application of pressure by the translation stage 120 coming down on the base 110. Such a process may provide a very uniform optical result, as the exposure of the solvent on the lens(es) can be made extremely uniform.

Figure 2:
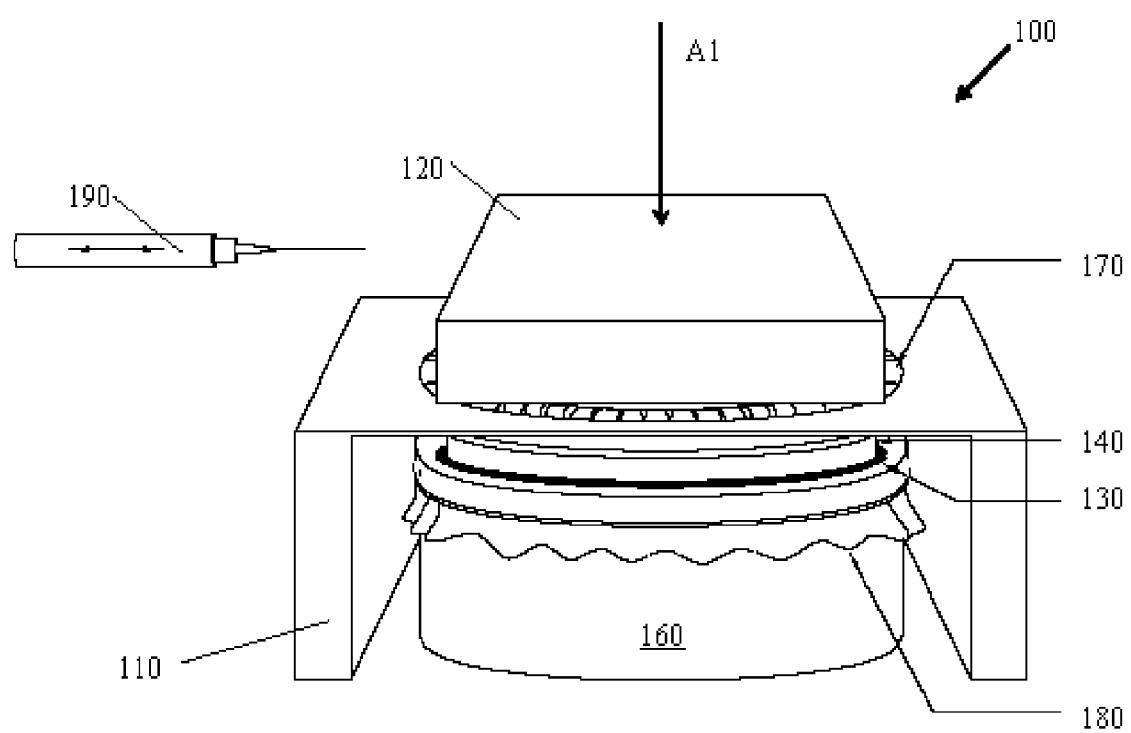
FIG. 2 illustrates the laminator described with reference to FIG. 1 during the laminating of the clear lens to the polarizing lens.

FIG. 2 illustrates the laminator 100 described above, during the laminating of the clear lens 140 to the polarizing lens 130. As the translation stage 120 moves down against the jig 160 held by the base 110, pressure that begins at a central portion, preferably the apex of lens 130 and a central portion, preferably the nadir, of lens 140 is first applied. The pressure then flows radially outward to the edges or perimeters of the lenses 130, 140. In this manner, the solvent flows from the center to the perimeter of the laminated structure. In addition, excess solvent is discharged at the perimeter of the structure, which then typically evaporates. This radial solvent flow process also drives bubbles, and in some cases debris, toward the perimeter of the lens structure, improving the optical quality of the bond.

As with the lamination of planar materials, uniformity is important in providing high quality curved laminates, both in terms of solvent exposure and pressure. Pressure uniformity refers to both local and global issues. The former simply requires that the substrates be free of digs/scratches. Local down-areas allow solvent to pool, as the mechanism applying the pressure is likely not to conform to small features. Due to long-term exposure to solvent, the dimensions of the damaged area can far exceed the dimensions of the defect that creates them. Such damage can take the form of a hazy patch, possibly with localized wavefront distortion due to swelling. On the other hand, minor scratches may just disappear.

Less abrupt local thickness variations can be caused by surface/thickness variations in the lenses 130, 140. For instance, the casting process of the super-stretch polycarbonate discussed above may produce surface undulations. Moreover, bondline non-uniformity of the adhesive used to form the polycarbonate polarizer (e.g., the PVA sandwiched between super-stretch polycarbonate) may contribute to non-uniformity. As the thermoforming process produces a wafer with an outer surface conformal to a mold, it is primarily the inner surface that is of concern. Normally, this surface vanishes after the injection molding is done. However, the presently disclosed approach relies on a surface that is sufficiently uniform to permit a solvent bond. One solution is to use a polycarbonate film on the inner surface of the polarizing lens 130 in which surface uniformity is emphasized, rather than birefringence. Both surfaces of the clear lens 140 are made by injection molding, and can therefore be extremely uniform in thickness. Another approach is to design the front surface of the injection molded clear lens 140 for optimal solvent bonding performance to the polarizing lens 130.

Global uniformity issues surround the solvent dispensing discussed above, along with thickness uniformity of the substrates, and thus the fixtures used to support the substrates during lamination. In some embodiments, the polarizing lens 130 can be quite thin (650 microns), and thus may require some mechanical support during the lamination process. Thick substrates, such as clear lenses, may be sufficiently thick that mechanical support over the entire surface area is less important, however, the flexibility of a thin polarizing lens 130 can be beneficial when bonding to a rigid clear lens. That is, the laminator 100 can force the polarizing lens 130 to conform to the contour of the clear lens 140 in many embodiments. Conversely, the bonding of two infinitely rigid substrates requires more extreme matching of the topography of the surfaces. A method for relaxing this requirement is to use a solvent having substrate powder or pellets dispersed or partially dissolved therein, rather than pure solvent. In some embodiments, a solution of the substrate material dissolved in the solvent lacking any substantial amount of undissolved solid substrate material may be used. In such embodiments, by dissolving or dispersing the powder or pellets of the substrate material in the solvent, a degree of gap filling can be achieved.

In the embodiment in FIG. 2, which is a vertical lamination arrangement, the clear lens 140 is positioned using the vacuum chuck 150, or another appropriate mechanical fixture. Locating pins or some other hard-stop means may be used to achieve accurate positioning of lenses in a repeatable manner when loading the laminator 100. Although the illustrated embodiment only shows the translation stage 120 being vertically moveable (arrow Al) with respect to the base 110, both of the fixtures holding the lenses 130, 140 may be made to translate when the two lenses 130, 140 are brought together after solvent dispensing. When initial contact is made, pressure is preferably made to grow radially, such that solvent also migrates radially, and a uniform bond is formed over the area between the lenses 130, 140. While some small-scale defects may be present, preferably, the bond is formed over the entire area between the lenses. This radial increase in pressure is produced largely by the action of the type of fixtures employed with the jigs holding the lenses 130, 140.

In accordance with the disclosed principles, there are various means for applying the preferred radial pressure profile. In some embodiments, mechanical distortion of one or both of the lenses 130, 140 by the fixtures/jigs holding the lenses 130, 140 can be used to control the spatial profile of the applied radial pressure. For instance, a molded/machined pad of a particular durometer and curvature may be selected such that the action of forcing the lenses 130, 140 into the pad produces a desired (temporal/spatial) pressure profile when the lenses 130, 140 are pressed together during lamination. Other fixtures that can be used to apply radial pressure include bladder presses, and rubber sheets mounted in a "drum-head" configuration as in the illustrated embodiment.

In the illustrated embodiments, the jig 160 holding the polarizing lens 130 includes a flexible fixture alignment device 170 configured to flex to the contour of the polarizing lens 130 it is holding. This flexible alignment device 170 may be constructed from cast silicone, however, any appropriate material may be employed. In addition to the flexible alignment device 170, the jig 160 holding the polarizing lens 130 also includes a deformable sheet 180, which can provide the "drum-head" configuration mentioned above. As illustrated, the deformable sheet 180 may be pulled taut across the top of the jig 160 such that it provided resistance to the downward pressure Al from the translation stage 120 of the device 100 during the lamination process, as shown in FIG. 2. Moreover, the alignment fixture 170 can also advantageously flex to match the altering curvature of lens 130 when the pressure is applied during the bonding, to more accurately hold the lens 130 in the desired place or position.

As the clear lens 140 is pushed downward by the translation stage 120, it contacts, preferably at its apex, the convex surface, preferably the nadir, of the polarizing lens 130 (which already has the dispensed solvent, as mentioned above). Once the two lenses 130, 140 contact each other, the downward pressure A1 causes the polarizing lens 130 to press into the deformation sheet 180 stretched across the jig 160. As the deformation sheet 180, which may be made from cast silicone, begins to give way to the pressure from the polarizing lens 130, the desired radial pressure begins at the center of curvature of the lenses 130, 140. A radial point mid-way to the edge of the lenses 130, 140 experiences a rise in pressure, while the pressure applied to the center may begin to saturate. Similarly, the pressure at this point may begin to saturate, just as the pressure at the edge of the laminate rises sharply. Once the pressure has been held at the perimeter for a sufficient duration to complete the bond, the lamination is complete and the pressure can be removed. The time required to bond the two lenses 130, 140 is dominated by load time, since the lamination can occur in a matter of a few seconds, depending on, for example, the solvent employed.

While various embodiments of the disclosed technique have been described above, it should be understood that they have been presented by way of example only, and not limitation. For example, while the exemplary embodiments depict systems and methods that apply a downward force toward the base, the system could be located so that the force is applied laterally to move the surface of the first lens toward the second lens. Likewise, the force may be applied to move the second lens toward the first lens. Alternatively, while the exemplary embodiments generally depict the solvent being applied to a concave portion of a portion of the second lens, the solvent may be dispensed onto a convex portion of the first lens if desired, especially where the first lens is located below the second lens and an upward force is used. Nevertheless, preferred embodiments employ a downward force wherein the solvent or slurry is disposed onto a portion of second lens or is dispensed as a vapor onto the desired surfaces. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A system for bonding lenses, the system comprising:
a translation stage configured to hold a first lens having a complex curvature, wherein the translation stage is configured to provide a force towards a base with a second lens having a complex curvature such that a portion of the surface of the first lens initially contacts a portion of the surface of the second lens;
an alignment fixture mounted on the base and configured to conform to the curvature of the second lens to hold the second lens;
a dispenser for dispensing a solvent between the lenses; and
a deformable sheet mounted on the base proximate to the alignment fixture, the deformable sheet configured to flex in response to the force so that either of the first or second lenses conforms to a curvature of the other, and so that the pressure of the first lens against the second lens presses the solvent radially outward to the perimeter of second lens to bond the first lens to the second lens, wherein the taut portion is substantially planar when the force is not being applied against the deformable sheet.

2. A system according to claim 1, wherein the translation stage is further configured to hold the first lens against the second lens such that the first lens bonds to the second lens using the solvent.

3. A system according to claim 1 wherein the portion of the surface of the first lens is the apex of the first lens.

4. A system according to claim 1 wherein the portion of the surface of the second lens is the nadir of the second lens.

5. A system according to claim 1 wherein the surface of the first lens is convex.

6. A system according to claim 1 wherein the surface of the second lens is concave.

7. A system according to claim 1, wherein the solvent softens the lenses at the molecular depth of their surfaces to bond the first lens to the second lens.

8. A system according to claim 1, wherein the second lens is substantially thinner than the first lens, and wherein the second lens conforms to the curvature of the first lens.

9. A system according to claim 1, wherein the dispenser is configured to dispense a solvent vapor between the lenses.

10. A system according to claim 1, wherein the dispenser is configured to dispense one or more droplets of solvent between the lenses.

11. A system according to claim 1, wherein the dispenser is configured to dispense a slurry having particles of lens material dispensed within a solvent.

12. A system according to claim 1, wherein the first lens is a clear lens and the second lens is a polarizing lens.

13. A system according to claim 8, wherein the lenses are polycarbonate lenses.

14. A system according to claim 1, wherein the solvent comprises a ketone-based solvent.

15. A system according to claim 1, wherein the deformable sheet is formed from cast silicone.

16. A system according to claim 1, wherein the translation stage comprises a vacuum chuck to hold the first lens.

17. A system for bonding lenses, the system comprising:
- a translation stage having a vacuum chuck configured to hold a first polycarbonate lens having a complex curvature, wherein the translation stage is configured to provide a force towards a base with a second polycarbonate lens having a complex curvature such that an apex of the first lens initially contacts a nadir of the second lens;
- an alignment fixture mounted on the base and configured to conform to the curvature of the second lens to hold the second lens;
- a dispenser for dispensing an adhesive solvent between the lenses;
- a deformable sheet having a taut portion proximate to the alignment fixture and stretched across a jig mounted on the base, the deformable sheet configured to flex in response to the force so that either of the first or second lenses conforms to a curvature of the other, and so that the pressure of the first lens against the second lens presses the solvent radially outward from the nadir to the perimeter of the second lens, wherein the taut portion is substantially planar when the force is not being applied against the deformable sheet; and
- wherein the translation stage is further configured to hold the first lens against the second lens with the pressure at the perimeters of the lenses such that the first lens bonds to the second lens using the solvent.

* * * * *